Nov. 4, 1952                M. H. HEBB              2,616,563
CENTRIFUGAL CLASSIFIER FOR SEGREGATING FINELY DIVIDED
PARTICLES ON THE BASIS OF SIZE AND DENSITY
Filed April 24, 1948                                     3 Sheets-Sheet 1

INVENTOR.
MALCOLM H. HEBB
BY
ATTORNEYS

INVENTOR.
MALCOLM H. HEBB

Patented Nov. 4, 1952

2,616,563

UNITED STATES PATENT OFFICE 2,616,563

CENTRIFUGAL CLASSIFIER FOR SEGREGATING FINELY DIVIDED PARTICLES ON THE BASIS OF SIZE AND DENSITY

Malcolm H. Hebb, Philadelphia, Pa., assignor to The Sharples Corporation, a corporation of Delaware Application April 24, 1948, Serial No. 23,015

5 Claims. (Cl. 209—144)

This invention relates to improvements in the grading or separation of particles of solids or liquids, and has for an object the provision of a method and means which in the absence of rotating mechanical elements is effective selectively to separate particles dispersed and suspended in a fluid medium.

The present invention is applicable to the grading of solid particles or liquid droplets dispersed in a fluid medium, either liquid or gas, depending upon the size and density of the particles. Accordingly, the term "particles" will hereinafter be utilized to mean either finely divided particles of solid material or relatively fine liquid droplets which when suspended or dispersed in a fluid or liquid medium will be acted upon in generally the same manner.

It has been common to use the method of elutriation in the classifying of finely divided materials. In a simple form of this method a powder is introduced into a vertical cylindrical column up which a stream of fluid such as air or water is passed at a predetermined velocity. The largest and heaviest particles will be carried by gravity down the column against the flow of fluid, while the smallest and lightest particles will be carried upward by the flow of the fluid against the force of gravity. The fine fraction is carried out by the outgoing fluid and reclaimed by suitable means. The coarse fraction usually accumulates in the column to be removed at intervals. If the turbulence of the flowing fluid, and other disturbing influences are sufficiently small, the division into a coarse and a fine fraction will be sharp. By this it is meant that substantially all particles larger than a certain critical size will pass down the column and appear in the coarse fraction and substantially all particles smaller than this critical size will be swept up the column and collected in the fine fraction.

In this process of elutriation, there is an opposition between two forces acting on each particle, on the one hand the weight, or the force of gravity urging the particle downward, on the other, the drag force on the particle produced by the relative velocity between the rising fluid and the particle, which urges the particle upward. When the particle is large and heavy the force of gravity predominates and when the particle is small and light, the drag force predominates. At some intermediate size and weight, at which the cut or division is to be made, the force of gravity and the drag force will be in balance and the particle will not tend to move either upward or downward.

The method of elutriation described is widely used in laboratory work for the analysis of powdered materials in accordance with particle size and for the preparation of small classified samples of powder. The elutriation method, however, suffers the severe limitation that bulky apparatus is required and the rate of production of classified powder is very low, especially when the cut is to be made in the subsieve range.

In attempts to overcome the limitation of small handling capacity, classifiers have been used in which the force of gravity is replaced by a centrifugal force. In these, the fluid in which the particles are suspended is set into rotation usually about a vertical axis. At the same time, it moves generally inward toward the axis, being discharged at an outlet closer to the axis than the inlet. In many machines of this type, the fluid has an additional component of velocity in the vertical direction (parallel to the axis of rotation), and the force of gravity also in this direction is a factor in the operation.

In general, there are two methods of producing the rotation in the type of classifier under consideration. In the first, the fluid carrying the particles is passed through a bladed rotor being fed in, at or near the periphery and discharged at or near the axis of the rotor. In this case, the classification occurs within the rotor, the larger and heavier particles, on which the centrifugal force predominates, being collected at the periphery and the smaller and lighter particles, on which the drag force due to the inflowing fluid predominates, passing out with the discharging fluid.

In the second method, which is that utilized in the present invention, the space in which the classification occurs is free of all moving mechanical parts. The rotation of the fluid and suspended particles is obtained by directing the fluid where it enters the classifying region so as to give it a tangential component of velocity relative to the desired axis of rotation. The fluid flows inward in a spiral vortex and is discharged at or near the axis. The larger and heavier particles again collect near the periphery of the classifying space, while the smaller and lighter particles are swept inwardly by the spiralling fluid and discharged in suspension.

The performance of classifiers incorporating a bladed rotor in the classifying region is poorer than might be expected because of the interference which the blades offer to the movement of the particles. This occurs partly on account of the turbulence of the fluid generated by the moving blades and partly from the tendency of a radially moving particle, through the well-known Coriolis force to acquire a tangential velocity relative to the rotor which may bring it into contact with a blade. In addition, classifiers of this type suffer appreciable wear of the rotor through abrasion by the particles and are expensive to construct and maintain.

In the past, classifiers in which there is no mechanical rotor in the classifying region, have been far inferior in the sharpness of separation of fine and coarse particles to the simple elutriation method already discussed. One important reason for this difference is that these classifiers do not maintain the same conditions of balance or unbalance between the centrifugal and drag forces on a particle throughout the classifying region.

In carrying out the present invention, there is maintained throughout a classifying zone a balance between centrifugal and drag forces on a particle of the size or weight at which a separation is desired. In the flow of fluid in a spiral vortex, a suspended particle experiences a centrifugal force which increases as the particle moves closer to the axis of rotation. As will be explained more fully below, this is caused by the tendency of the rotating fluid and particle to maintain a constant angular momentum during the inward motion and so to rotate more and more rapidly as the axis is approached. In order to maintain a balance between centrifugal and drag forces it is, therefore, necessary to cause the drag force to increase as the distance to the axis of rotation decreases. In carrying out the present invention in one form thereof, the foregoing is accomplished by reducing the axial height of the classifying space at the smaller distances from the axis. The progressive reduction in height from the outer boundary to the inner boundary of the separating or classifying zone has the effect of increasing the inward radial component of fluid velocity and so increasing the inward drag force. The manner in which the axial height varies with the radius is such that a particle of predetermined or selected critical size, which (instantaneously) has no motion radially either inward or outward but is travelling in a circular path, experiences an inward drag force substantially equal to its centrifugal force at all points of the classifying zone or space. If the particle is larger than the critical size, for which the centrifugal and drag forces are in equilibrium, then the centrifugal force will predominate and the particle will tend to move away from the axis, no matter where in the classifying space it happens to find itself. Similarly for a particle smaller than the critical size, the drag force will prevail and the particle will be urged toward the axis of rotation.

In the present description it is convenient to refer only to the size of the particles as though this were the only variable. It is obvious that separation of particles depends not on size alone but also on such other factors as density and shape. It will be understood that where these factors are not constant, they are to be taken into account. For example, an increase in the density of the particles is equivalent to an increase in their size. Accordingly the term "size" has been used herein in the broader sense to include a change in density which gives rise to an effect the same as an increase or decrease in size.

Throughout the separating zone, of substantial extent, the centrifugal force acting upon the particles of a given size is balanced by a drag force of the fluid stream, which force radially opposes the centrifugal force and is made to progressively increase in magnitude from the periphery of the separating zone toward the axis of rotation. By progressively decreasing the cross-sectional area of the separating zone from the periphery toward the axis, the radial flow is increased to increase the drag force so that throughout the radial extent of the separating zone, the drag force is equal to the centrifugal force for particles of the critical size. In consequence, throughout the separating zone the forces acting on particles of the selected size will be balanced and there will be little, if any, tendency for them to move radially toward or away from the axis of rotation. However, particles larger than the critical size move outwardly under the influence of centrifugal force, while particles smaller than the selected size move inwardly under the influence of the drag force. Hence, there is established critical separation between particles larger and smaller than the selected size. The finer fraction is substantially free of coarser particles and the coarser fraction is substantially free of particles smaller than the selected size. There is compensation for certain random disturbances which may cause departures from the ideal case. Unavoidable turbulence in the moving fluid, randomly varying conditions of motion of the entering particles, small irregularities in the walls of the classifier, and other factors, may combine to cause a particle momentarily to move oppositely to the direction in which on the average it would move at this position. It is clear that these chance disturbances are minimized and overcome since the net force acting on a particle throughout the classification zone has the same direction for all positions of the particle and is either generally inward for particles smaller than the critical size or outward for larger particles.

For further objects and advantages of the invention, reference is to be had to the following detailed description taken in conjunction with the accompanying drawings in which.

Figure 3:
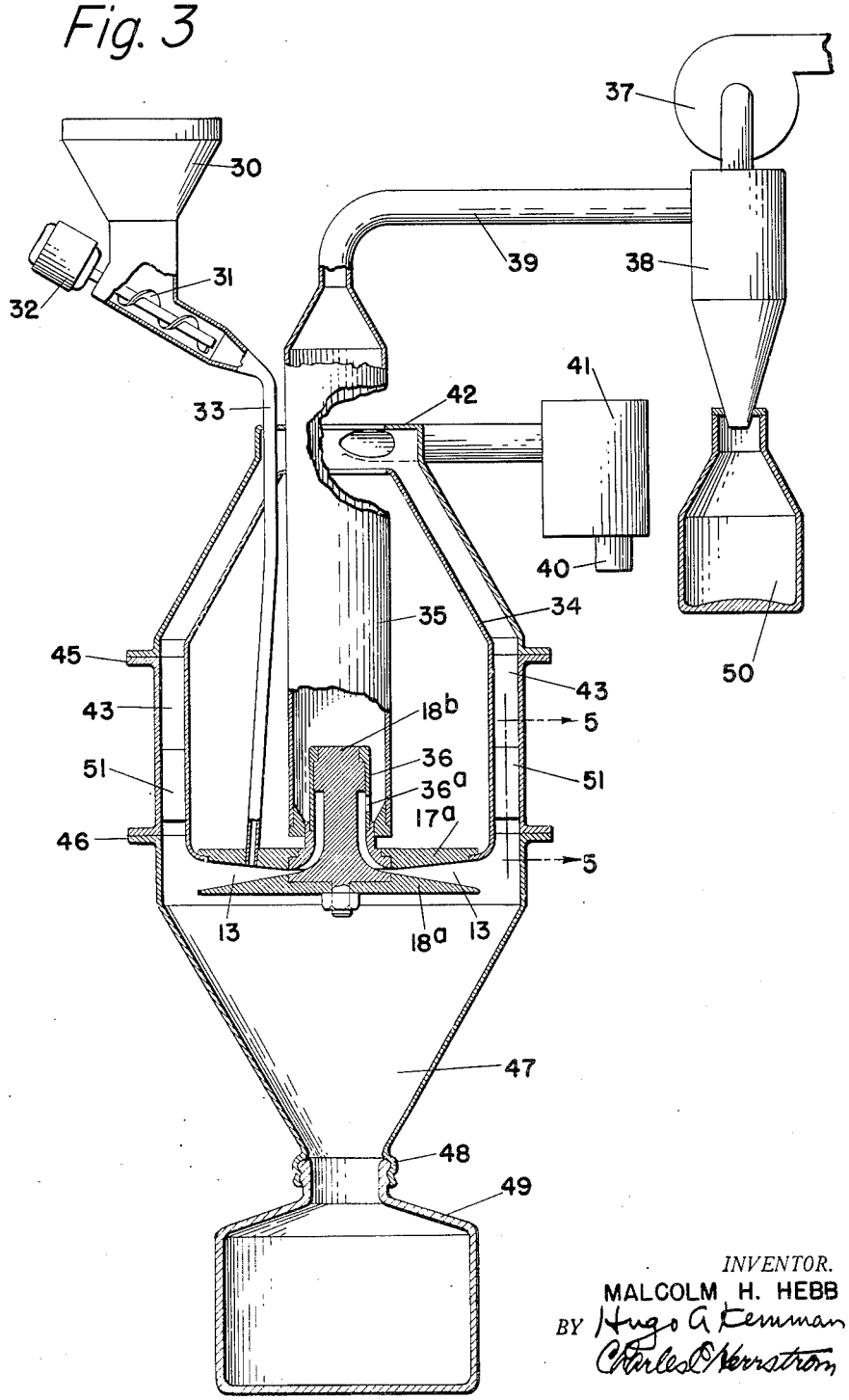
Figure 4:
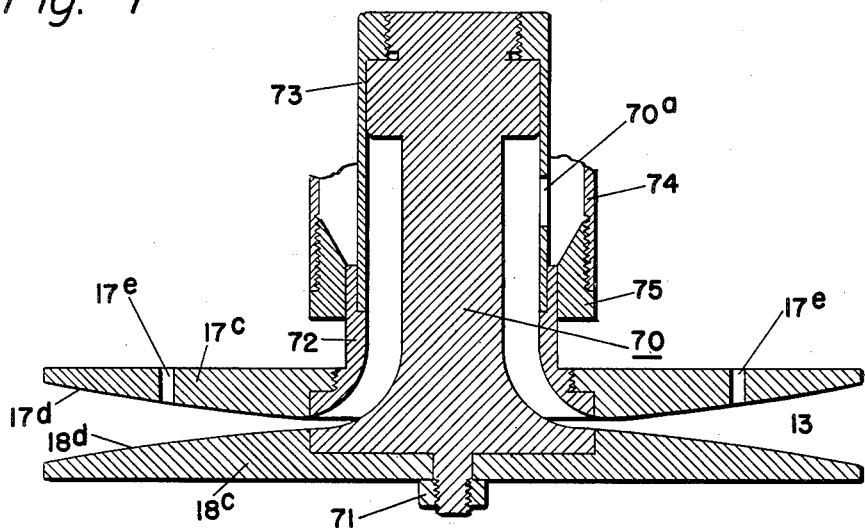
Figure 5:
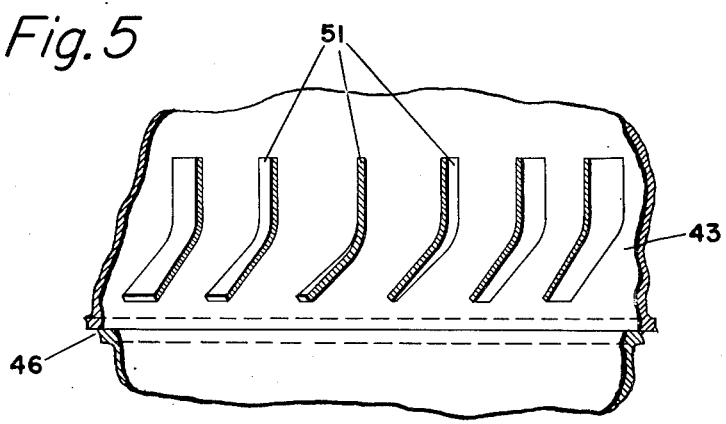

Fig. 3 diagrammatically illustrates a further embodiment of the invention and includes a sectional view of a modified form of separating device;

Fig. 4 is a fractional sectional view of a still further modification of the invention; and Fig. 5 is a sectional view taken on the line 5—5 of Fig. 3.

Figure 1:
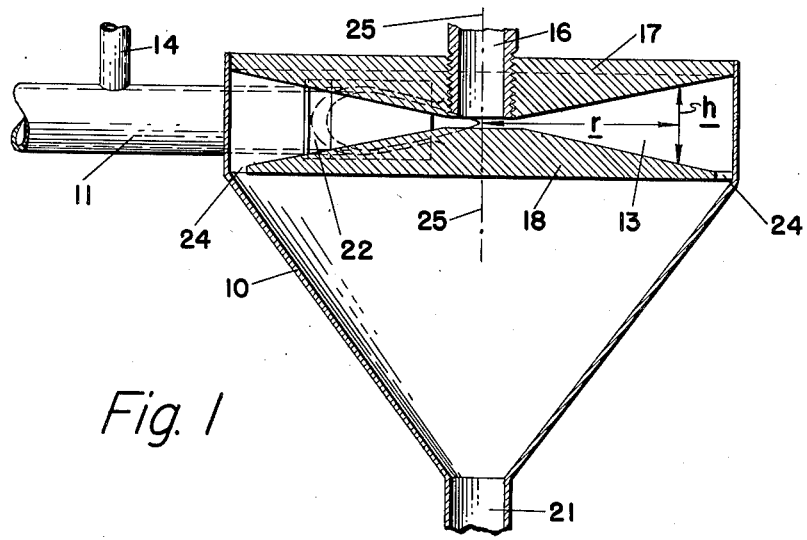
Fig. 1 is a sectional view, taken on the line 1—1 of Fig. 2, of an apparatus embodying the invention.
Figure 2:
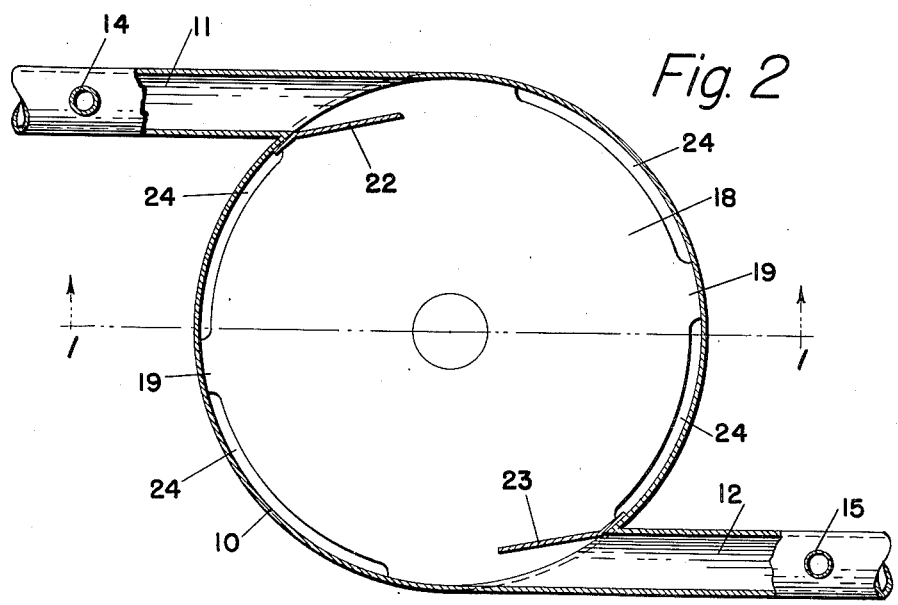
Fig. 2 is a plan view partly in section of Fig. 1.

Referring to Figs. 1 and 2 the invention in one form has been shown as comprising a housing or casing 10 into which a fluid medium is directed by way of inlet conduits 11 and 12. These conduits are arranged for entry of the fluid medium tangentially of the housing or casing 10, which in the region of a separating zone 13 is cylindrical in shape. While water or other liquids may be advantageously used, and while gases of any kind will be quite satisfactory, it will be assumed, for purposes of the following description, that air comprises the fluid medium. A stream of particles of heterogeneous size flows by inlet conduit 14 into the stream of air in conduit 11. If desired, a second stream of such particles may be introduced through a second inlet conduit 15. An outlet conduit 16 is disposed concentric with the axis of the separating zone 13 for exit of air and particles from the separating zone. The tangential introduction of the two streams of air into the separating zone 13 produces spiral vortex flow therein. The flowing air, together with the particles in suspension therein, spiral around the separating zone 13 with a tangential velocity or speed thereof which increases from the periphery of the separating zone toward the central axis thereof. Accordingly, the radially-acting centrifugal force, which tends to move all of the particles radially out of zone 13, increases from the periphery toward the axis of rotation. Though the centrifugal force increases from the periphery of zone 13 toward its central axis, it is, for particles of a selected or critical size, substantially balanced throughout the separating or classifying zone by an oppositely and inwardly acting radial force, which also increases from the periphery towards the center, produced by the drag of the inwardly flowing air on such particles. The drag force is progressively increased by a progressive increase in the radial flow of air brought about by a gradual reduction in the cross-sectional area of the separating zone 13 from the periphery thereof toward the axis of rotation. The upper wall of the separating zone 13 is formed by a frustro-conical member 17, while the lower wall is formed by a second frustro-conical member 18. The two members are supported in spaced relation one from the other with their apexes in opposing relation. These wall members 17 and 18 thus form a separating zone 13, free of moving parts, comprising an unobstructed and circular passage of gradually decreasing cross-sectional area from the periphery toward the center thereof. The upper wall member 17 may be conveniently supported from the housing 10. The lower wall member 18 is provided with a series of projections 19 arranged to engage or to rest upon the downwardly converging housing 10. The projections may be secured to the wall of housing 10 in any suitable manner, as by screws, or the projections 19 of the member 18 may merely rest upon the lower conical wall of housing 10, which, it will be observed, is connected to an outlet conduit 21 for withdrawal of the coarse fraction. The inward flow of air to the separating zone 13 may be deflected or directed as desired by pivoted deflector plates 22 and 23, Fig. 2, to control the radial speed of the vortex flow. One end of each plate may be fastened to housing 10 and the blades bent or preset, the pivotal axis being adjacent the fixed end of each member.

In operation, the stream of heterogeneous particles of material to be classified enters the conduit 11 and/or the conduit 12 and is spspended in the fluid medium stream flowing inwardly through conduits 11 and 12. Accordingly, the streams of air with the particles in suspension, join in vortex flow around the separating zone 13. It will be further assumed that the vanes 22 and 23 have been preset to produce a radial speed for separation of particles of a predetermined critical size. Particles smaller than the selected critical size will remain in suspension in the fluid medium and as a result of the predominating drag force will be carried out of the separating zone through the conduit 16. For particles of size smaller than the selected size, the drag force will always be greater than the centrifugal force and such particles of smaller size will always move inwardly through the separating zone 13 and will be discharged through the conduit 16. On the other hand, particles larger than the critical size will be acted upon throughout the separating zone 13 by a changing centrifugal force of greater magnitude than the drag force. While the centrifugal force is a maximum nearer the axis of rotation, and gradually decreases toward the periphery of the vortex, the drag force is also made maximum near the axis of rotation since the cross-sectional area of the separating zone 13 is made small near the axis and gradually increases toward the periphery. The centrifugal force for the critical size of particle is throughout the classifying zone balanced by the drag force. Accordingly, the particles of larger size always move outwardly and by gravity flow downwardly through the openings 24 which extend between adjacent projections 19 and into the pipe 21 leading to a suitable receiver, not shown in Fig. 1.

Since the centrifugal force acting upon particles of a critical size is throughout the separating zone 13 balanced by the drag force, it will be understood that there will be many opportunities for a particle which is larger or smaller than the particle of critical size to move in the proper direction. This is important since localized disturbances will deflect such particles from such a course and would in the absence of this feature greatly interfere and prevent the sharpness of separation or classification that is desired. However, by providing a separating zone of substantial extent, the patricles larger and smaller than the critical size are acted upon through a time interval which is great compared with previously constructed classifiers in which forces on a particle of critical size were balanced in a very narrow zone and during a very short period of time. It will be further observed that only the fluid medium itself and the particles suspended therein comprise the moving and active elements. There are no moving mechanical parts. The apparatus is exceedingly simple from the standpoint of construction and operation. The fraction of smaller size particles carried from the separating zone by way of outlet conduit 16 will be substantially free of particles of the larger size which are removed through the outlet pipe 21, and vice versa. The smaller particles carried out with the air stream may be separated therefrom in a collector of any effective well-known type of which there are a number known to those skilled in the art. The desired flow of air or fluid through the separating zone 13 may be produced by either a force fan or a suction fan as may be desired, or both types may be utilized.

In Fig. 1, the separating zone 13 is formed by surfaces of revolution as by the frustro-conical end walls 17 and 18. The conical walls 17 and 18 are shown constructed so that the linear sloping walls thereof when extended, meet at a common center.

A more detailed consideration of the manner in which the cross-sectional area of the separating zone 13 shall decrease toward the axis of rotation will now be presented. As has already been explained, the fluid in the classifying chamber has two primary motions: First, it has a rotation represented by a tangential component of velocity $v_t$ at a distance $r$ from the axis 25. Second, it has an inward flow represented by an inward radial component of velocity $v_r$ at distance $r$ from the axis. A particle suspended in the fluid will be set into rotation in approximate synchronism with the fluid. In other words, the tangential component of velocity of the particle will also be approximately $v_t$ at distance $r$ from the axis. As a consequence of its rotation, the particle will experience a centrifugal force which acts in a direction to urge the particle radially outward and so against the motion of the inwardly flowing fluid. The magnitude of the centrifugal force is $$f_c = mv_t^2/r \quad (1)$$

in which $m$ is the effective mass of the particle which may be defined as the difference between its actual mass and the mass of fluid it displaces.

The tangential velocity $v_t$ is not constant from point to point but increases with decreasing distance $r$ from the axis 25 of rotation. This variation in $v_t$ arises from the tendency of each element of the fluid to conserve its angular momentum. If this law were followed exactly one would have $r \times v_t = k = $ constant, i. e., $v_t = k/r$. Thus, in ideal vortex motion, the tangential velocity is inversely proportional to the distance from the axis. In this case, the centrifugal force on a particle becomes $$f_c = \frac{mk^2}{r^3} \quad (2)$$

Actually, on account of its interaction with the walls of the classifying chamber, the rotating fluid is continually losing angular momentum so that the tangential velocity will increase somewhat less rapidly with decreasing distance $r$ than the inverse first power. Usually, if care is taken to make the walls of the classifying space smooth and free of irregularity and if the fluid velocities are not too low, particularly the radial velocity, the departure from the inverse first power law will be negligibly small. If not, the measured law of tangential velocity variation can be used in Eq. 1. In what follows it will be assumed that Eq. 2 is sufficiently accurate.

According to Eq. 2, the centrifugal force acting on a particle in the classifying space, will be inversely proportional to the cube of its distance $r$ from the axis of rotation.

The inward flow, particularly the radial component of inward flow of fluid produces a drag force on a particle in suspension, acting radially inward and so in opposition to the outward centrifugal force. Let this drag force be represented by $f_d$. It depends on several factors including particle size, fluid viscosity and the velocity of flow of the fluid relative to the particle. In the case of a particle rotating in synchronism with the fluid and moving neither inward nor outward, the velocity of relative motion is $v_r$ the inward radial velocity of the fluid. It is required to vary the fluid velocity $v_r$ in such a way that the drag force $f_d$ on a particle of the size or weight at which the cut or separation is desired, is just equal to the centrifugal force at all points in the classifying space. In particular, this implies that the drag force $f_d$ is to vary as the inverse cube of the distance $r$ to the axis of rotation.

As has been stated, the drag force depends among other factors on $v_r$ the radial velocity of the fluid. For low velocities and/or small particles, $f_d$ is directly proportional to $v_r$; for high velocities and/or large particles $f_d$ is proportional to the square of $v_r$; and for intermediate velocities and/or particle sizes a transition law is followed. In order to determine the value of $v_r$ at each value of $r$ required to give the desired variation of $f_d$, resort may be had to tabulated or graphed empirical drag coefficients and $v_r$ determined by well-known numerical methods. However, it will be supposed here that the velocities are not too high and that the particles are sufficiently small for the drag force to be proportional to the velocity. Then Stoke's law of drag force can be used, viz $$f_d = 3\pi\eta D v_r \quad (3)$$

in which $\eta$ (eta) is the velocity of the fluid and $D$ the diameter of the particles, which are assumed spherical. Also with spherical particles $m = \pi\Delta D^3/6$, in which $\Delta$ is the difference in density between the particles and suspending fluid. The condition of balance between centrifugal (1) and drag forces (3) for a particle of diameter $D$ requires $$v_r = \frac{\Delta D^2 v_t^2}{18\eta r} \quad (4)$$

or $$v_r = \frac{\Delta D^2 k^2}{18\eta r^3} \quad (5)$$

Accordingly, $v_r$ is required to vary as the inverse cube of $r$. This variation is accomplished by varying the axial width of the classifying zone with $r$. Let $h$ represent this width at a radius $r$ from axis 25. Then $$v_r = \frac{Q}{2\pi r h} \quad (6)$$

where $Q$ is volume flow rate of fluid through the classifier. A combination of Eqs. 5 and 6 shows that $$h = \frac{9\eta Q}{\pi \Delta D^2 k^2} r^2 \quad (7)$$

The shapes of the end members 17 and 18 of the classifying zone may be chosen to satisfy Eq. 7. For example, both end members may be paraboloids of revolution.

When the end members have been made in accordance with the requirements of Eq. 7, the ratio $h/r^2$ has a constant value in the classifying zone. In particular it is equal to the ratio $h_o/r_o^2$ in which $h_o$ is the axial width and $r_o$ the radius at the outer edge of the classifying zone. In addition, it has been shown above that $k$ is the constant value of the product $rv_t$ and so equal to $r_o v_{to}$ in which $v_{to}$ is the tangential velocity at the outer edge of the classifying space. In equation form therefore $$h/r^2 = h_o/r_o^2, \text{ and } k = r_o v_{to} \quad (8)$$

Combining these formulas with Eq. 7 gives $$D^2 = \frac{9\eta Q}{\pi \Delta h_o v_{to}^2} \quad (9)$$

Equation 9 shows the relation between $D$, the particle diameter at which the cut is made, and the other variables of the system. In particular $D$ depends on fluid flow rate $Q$, the tangential velocity $v_{to}$ at $r_o$ and the axial spacing $h_o$ at $r_o$. Any or all of these variables can be changed for convenient control of the diameter $D$ at which the cut is to be made. For example, a change in the speed of a fan will change the flow rate $Q$ and the tangential velocity $v_{to}$, while change in the positions of the vanes 22 and 23 will change the tangential velocity. As the vanes are moved toward the outer wall the tangential velocity will be increased and the critical particle size selected for demarcation between the product fractions will be smaller. It is to be understood, of course, that a change of $h_o$ implies a proportionate change at all radii and so requires substitution of new end members.

An advantage of the present invention which has not been mentioned heretofore is the following: As shown in Fig. 1 the distance between each of the end members 17, 18 and the median plane decreases from the periphery of the classifying zone toward the center. The inflowing fluid, therefore, has a small component of flow velocity toward the median plane. As a consequence, particles in suspension are acted on by an additional force urging them toward the median plane and hence away from the walls of the end members. In fact, it has been observed that the finely divided material being classified tends to stratify itself in a narrow band about the median plane and to avoid the region close to the end walls. The result is to improve the classification by avoidance of interference with the walls and in addition to reduce abrasion of the walls.

With the above comprehensive understanding of the principles of the invention, it will be understood that various modifications may be constructed embodying those principles. Referring to Fig. 3, a complete system has been diagrammatically illustrated. Material to be classified is fed from a hopper 30 by suitable feeding means such as a screw conveyor 31 driven by a motor 32 into a feed pipe or header 33 which enters the separating zone 13 intermediate the ends thereof. The upper end member 17a thereof is supported from an enclosing wall 34 while the lower end member 18a is provided with a central projection 18b which extends upwardly through an outlet pipe 35 and has a reduced portion above a shoulder which is secured to a cylindrical supporting member 36, as by brazing or by screws (not shown). The member 36 in turn may rest upon a component part of the upper end member 17a and by means of a cylindrical member or outlet pipe 35, the various parts may be mechanically interlocked together as by brazing or by screws (not shown). A blower or suction fan 37 is connected to a collector 38 of the cyclone type and to a conduit 39 which leads to the outlet pipe 35.

Suction is applied through a series of openings 36a in the cylindrical member 36 to the separating zone 13. Under the influence of the applied suction, air flows through an inlet conduit 40, passes through a filter 41, thence into manifold 42 and downwardly through supply conduits 43. As shown in Fig. 3, the supply channels 43 may be continuous circumferentially of the machine and suitably connected together at the flanges 45 and 46. The lower conical end 47 of the apparatus may terminate near its apex in a threaded member 48 for attachment to a material-receiving receptacle 49. For separating machines relatively small in size, the threaded member 48 may receive a glass or metal jar 49 with a threaded end.

The disposition of the material feed pipe 33 for admission of the material to be separated intermediate the outer and inner limits of the separating zone is advantageous due to the fact that all entering particles are immediately subjected to the opposing forces. All particles must traverse a substantial fraction, in Fig. 3 at least half of, the separating zone, and in such traverse, the oppositely acting forces nicely segregate and classify them. There is, accordingly, minimized the tendency of the larger particles to entrap or carry with them smaller particles. At present the feeding method of Fig. 3 is preferred. It has the further advantage of entry of the particles into the zone of vortex flow where the particles will be quickly suspended by the rotating mass of air.

Though the collector 38 has been referred to as of the cyclone type, its particular construction is not of great importance, the only requirement in connection with the present invention being that it shall be of a type which will separate the lighter cut from the air or fluid in which it is suspended. A suitable container 50 is provided to receive the fraction comprising the particles of smaller size.

If the inner surfaces of the end members 17a and 18a be parabolic with an extension of the surfaces intersecting at a common point midway of the separating zone, it will be found that circles which pass through that point and through the same outer limit of the separating zone closely approximate the parabolic shape. In practice, the foregoing circular shape has been found to be satisfactory. If straight lines be drawn, generally symmetrical along such parabolas, or circles, the departure from the parabolic shape will not be excessive and in practice has been found to result in satisfactory classification or separation of particles above and below a critical size. Accordingly, in Fig. 3, the surfaces have been shown as surfaces of revolution generated by straight lines. As viewed in Fig. 3, it will be seen that the apex of the conical surface of member 18a lies above the apex of conical member 17a, a circumstance resulting from selecting the generatrix of each surface in the foregoing relation with respect to the parabolas.

In Fig. 3, directing vanes 51, curved as shown in Fig. 5, have been utilized to direct the air for tangential flow into the separating zone or chamber 13. Where separate pipes are used, they may have their ends disposed tangentially to the zone to produce the vortex flow.

The modification of Fig. 4 may be utilized in place of the arrangements of any of the preceding modifications and represents a satisfactory method of fabricating the parts forming the separating zone 13. Moreover, the surfaces 17d and 18d have been illustrated as surfaces of revolution generated by a circular line having a radius such that extensions of the surfaces would intersect midway of the apparatus. The surfaces may be made parabolic as previously explained. The lower end member 18c may be removably secured to a central post 70 by means of a nut 71, while the upper end plate 17c may be threaded onto a cylindrical member 72 which is itself secured to a cylindrical member 73 into which the post 70 is threaded. The cylindrical member 73 is provided with a plurality of outlets 70a for passage of the finer fraction into the outlet conduit 74 which is itself threaded to an annular member 75.

If the assembly of Fig. 4 be utilized in a system such as shown in Fig. 3, it will be understood that the separating or classifying zone will extend from the periphery of members 17c and 18c to the neck portions or throughout the region in which the cross-sectional area of the flow channel is decreasing. By providing a classifying zone of substantial radial extent, particles entering through a plurality of openings or elongated slots 17e are immediately suspended in the fluid medium and are acted upon both by the centrifugal and drag forces of the fluid medium.

Now that the principles of the invention have been fully disclosed, it will be understood that the invention may be embodied in apparatus of any desired size, depending upon the volume of material to be handled, and upon the desired radial extent of the separating or classifying zone. By way of example and not of limitation, in one form of apparatus embodying the invention the radius from the axis of rotation to the outer boundary of the separating zone was four inches. The radius to the inner boundary was two inches. In this particular embodiment of the invention, the separating zone was formed by the conical surfaces such as illustrated in Fig. 3. The paraxial separation of the opposed conical surfaces was at the inner boundary one-quarter of an inch and at the outer boundary of the separating zone one inch. The term "paraxial" means, and is used, to indicate the distance between the opposed surfaces measured along a line parallel to the axis of rotation. The volume flow rate of air was fifty cubic feet per minute. The tangential air velocity at the outer radius was fifteen feet per second. With a particle density of approximately 3, such as for magnesite, the approximate diameter at which a cut was made was 30 microns. By increasing or decreasing the tangential air velocity, as by changing the inclination of vanes 51, the separation will be between particles of size respectively smaller and larger than the aforesaid 30 microns.

In the foregoing explanation of the invention, reference has been made to the shape of opposed surfaces as being either conical, parabolic, or spherical. Reference has also been made to the fact that circular and straight generatrices represent practical approximations to parabolas. In view of the foregoing, it is to be understood that the opposed surfaces throughout the separating zone may have different shapes. In the preferred form of the invention, the paraxial distances at different radial distances $r$ throughout the separating zone should not substantially exceed values determined by the following formula for the paraxial distances $h$:

$$h = \frac{b(r-r_i) + a(r_o-r)}{(r_o-r_i)} \quad (10)$$

where $b$—is the paraxial distance at the outer limit or boundary of the separating zone
$a$—is the paraxial distance at the inner limit or boundary of the separating zone and is always less than $b$
$r_i$—is the radius to the inner limit of the separating zone
$r_o$—is the radius to the outer limit of the separating zone.

In the preferred form of the invention the values $h$ should not be substantially less than values determined by the following formula:

$$h = \frac{a(r_o^2-r^2) + b(r^2-r_i^2)}{(r_o^2-r_i^2)} \quad (11)$$

Accordingly, the opposed surfaces may have any shape lying between the limits which are approximated by the two Formulas 10 and 11 above set forth and in which said paraxial distances for particles of a given size produce a progressively increasing drag force which balances throughout said separating zone an oppositely acting progressively increasing centrifugal force effectively to separate or classify a finely divided mixture into a coarse fraction and a fine fraction.

In addition, as appears from Formula 7, the width $h$ of the classifying zone, i. e., the paraxial distance of the opposed surfaces, at any radial distance $r$ in accordance with one form of my invention is proportional to $r^2$. Consequently the paraxial distance $a$ at $r_i$ is proportional to $r_i^2$ and the paraxial distance $b$ at $r_o$ is proportional to $r_o^2$. It follows therefore that the spacing of the opposed surfaces will satisfy the following equation:

$$\frac{a}{b} = \frac{r_i^2}{r_o^2} \quad (12)$$

While preferred modifications of the invention have been disclosed, it will now be obvious to those skilled in the art that further modifications may be made and the features of one modification may be utilized with or in substitution for other features of other modifications, all within the scope of the appended claims.

What is claimed is:

1. A classifier for segregating on the basis of size and density particles of a finely divided material comprising two opposed walls forming a separating zone having surfaces of revolution with the paraxial distances $h$ therebetween at radial distances $r$ between an inner radial limit $r_i$ and an outer radial limit $r_o$ not substantially exceeding values determined by $$h = \frac{b(r-r_i) + a(r_o-r)}{(r_o-r_i)}$$

and not being substantially less than values determined by $$h = \frac{a(r_o^2-r^2) + b(r^2-r_i^2)}{(r_o^2-r_i^2)}$$

where $a$ is the paraxial spacing at the inner radial limit $r_i$ of said separating zone and $b$ is the paraxial spacing at the outer radial limit $r_o$ of said separating zone, means for producing between said walls inwardly spiralling vortex flow of a fluid medium with said finely divided particles in suspension therein, a centrally disposed outlet for said fluid medium and an outlet passage for larger particles disposed in the vicinity of the outer boundary of said zone.

2. Apparatus for segregating particles of a finely divided material on the basis of size and density comprising two walls having surfaces of revolution with the paraxial distance therebetween progressively increasing outwardly from the inner to the outer radial boundaries of an annular separating zone, an outlet conduit disposed centrally of at least one of said walls, fluid-directing structure for producing within said separating zone an inwardly spiralling vortex flow of a fluid medium with said finely divided particles in suspension therein, said paraxial distance progressively increasing as the square of the radial distance to increase an inwardly directed drag force on particles of a given size at about the same rate as an opposed outwardly directed centrifugal force increases from the outer radial boundary of said separating zone to the inner radial boundary thereof, a finer fraction of said particles upon which the drag force predominates over the centrifugal force being moved with the fluid medium through the central outlet conduit, and an outlet so disposed with respect to the zone of opposed forces to receive a coarser fraction of particles separated from the finely divided material by the predominance on the coarser fraction of the centrifugal force over the drag force.

3. Apparatus for segregating particles of a finely divided material on the basis of size and density comprising two walls having surfaces of revolution with the paraxial distance therebetween progressively increasing outwardly from the inner to the outer radial boundaries of an annular separating zone, an inlet intermediate said boundaries for introduction of the finely divided material into said zone, an outlet conduit disposed centrally of at least one of said walls, fluid-directing structure for producing within said separating zone an inwardly spiralling vortex flow of a fluid medium, said paraxial distance progressively increasing as the square of the radial distance to increase an inwardly directed drag force on particles of a given size at approximately the same rate as an opposed outwardly directed centrifugal force increases from the outer radial boundary of said separating zone to the inner radial boundary thereof, an outlet so positioned with respect to said zone in which said forces are opposed as to receive as a result of the interaction of the forces on said material a coarser fraction of particles upon which the centrifugal force predominates over the drag force, a finer fraction of particles upon which the drag force predominates over the centrifugal force being carried through said outlet conduit with the fluid medium.

4. Apparatus for separating a mixture of particles on the basis of size and density, which comprises a classifying zone free from rotary members and having two opposed walls having surfaces of revolution with the paraxial distances $h$ therebetween at radial distances $r$ between an inner radial limit $r_i$ and an outer radial limit $r_o$ not substantially exceeding values determined by $$h = \frac{b(r-r_i) + a(r_o-r)}{(r_o-r_i)}$$

and not being substantially less than values determined by $$h = \frac{a(r_o^2 - r^2) + b(r^2 - r_i^2)}{(r_o^2 - r_i^2)}$$

where $a$ is the paraxial spacing at the inner radial limit $r_i$ of said classifying zone and $b$, always larger than $a$, is the paraxial spacing at the outer radial limit $r_o$ of said classifying zone, fluid-directing structure for producing between said walls inwardly spiralling vortex flow of a fluid medium with said particles in suspension therein, a centrally disposed outlet conduit for said fluid medium and a fine fraction of said particles, and an outlet passage for larger particles in the vicinity of the outer boundary of said zone.

5. The combination set forth in claim 4 in which $a$ is to $b$ as $r_i^2$ is to $r_o^2$.

MALCOLM H. HEBB.

REFERENCES CITED

The following references are of record in the file of this patent:

UNITED STATES PATENTS

| Number | Name | Date |
|---|---|---|
| 416,124 | Reeves | Nov. 26, 1889 |
| 2,032,827 | Andrews | Mar. 3, 1936 |
| 2,276,761 | Carey | Mar. 17, 1942 |
| 2,329,299 | Rourke | Sept. 14, 1943 |
| 2,338,779 | Mutch | Jan. 11, 1944 |
| 2,390,678 | Andrews | Dec. 11, 1945 |

FOREIGN PATENTS

| Number | Country | Date |
|---|---|---|
| 506,488 | Great Britain | May 30, 1939 |
| 544,397 | Great Britain | Apr. 10, 1942 |